A. P. MORROW.
CHUCK.
APPLICATION FILED MAY 11, 1911.

1,251,558. Patented Jan. 1, 1918.
2 SHEETS—SHEET 1.

Witnesses
Joseph C. Stack.
R. H. Bishop

Inventor
Alexander P. Morrow
By Julian C. Dowell
his Attorney

A. P. MORROW.
CHUCK.
APPLICATION FILED MAY 11, 1911.
1,251,558.
Patented Jan. 1, 1918.
2 SHEETS—SHEET 2.
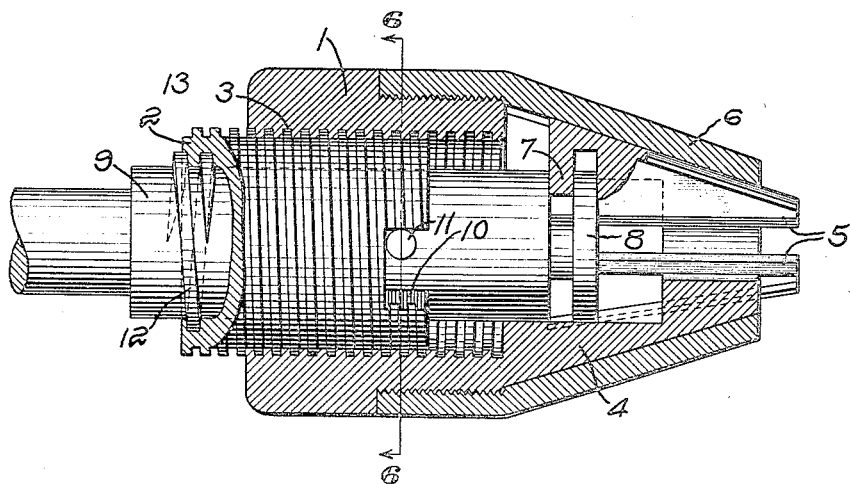
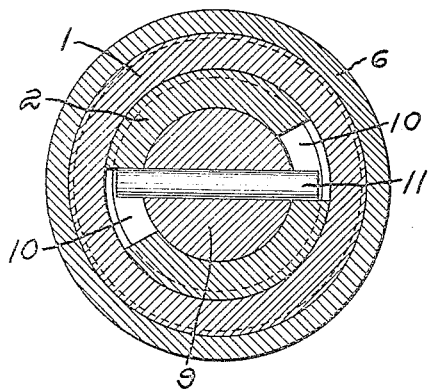
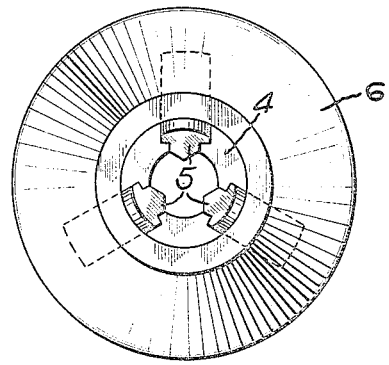
Inventor:
Alexander P. Morrow,
by Emery, Booth, Janney & Varney
Attys.

UNITED STATES PATENT OFFICE.

ALEXANDER P. MORROW, OF ELMIRA, NEW YORK, ASSIGNOR TO E. HORTON & SON COMPANY, OF WINDSOR LOCKS, CONNECTICUT, A CORPORATION OF CONNECTICUT.

CHUCK.

1,251,558.      Specification of Letters Patent.      Patented Jan. 1, 1918.

Application filed May 11, 1911. Serial No. 626,504.

*To all whom it may concern:*

Be it known that I, ALEXANDER P. MORROW, a citizen of the United States, residing at Elmira, in the county of Chemung and State of New York, have invented certain new and useful Improvements in Chucks, of which the following is a specification.

This invention relates to chucks having sliding jaws fitted in a rotatable case mounted upon a spindle and connected thereto by screw threads and so connected with said jaws that by a rotation of the case the jaws are made to operate and grip or release the shank of a drill or other tool.

In using chucks of the character described and herein illustrated, after rotating the case and closing the jaws firmly upon the shank of the drill or other tool the binding contact or frictional resistance of the screw threads encountered on the initial reverse or unscrewing movement frequently renders it difficult to release the jaws so that considerable time is lost, inconvenience experienced, and additional power required to start the releasing movement of the jaws. The object of my invention is to provide efficient means whereby the jaws may be made easily and quickly to relax their grip and then recede into the case with the exertion of less power than has been heretofore required for the operation.

One means for attaining the desired object is illustrated in the accompanying drawings and the present invention consists in certain novel features which will be hereinafter described and more particularly pointed out in the appended claims.

Figure 1:
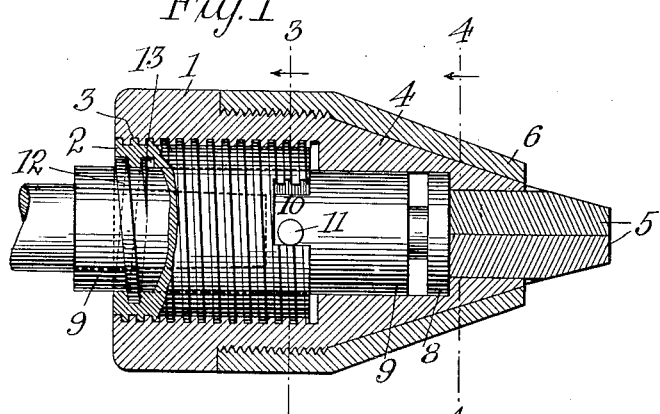
Figure 1 is a longitudinal sectional view of a chuck embodying my improvements, the jaws being closed.
Figure 2:
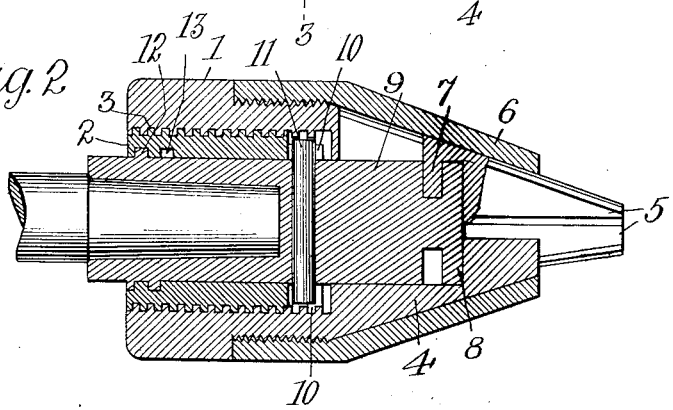
Fig. 2 is a similar view taken at a right angle to Fig. 1.
Figure 3:
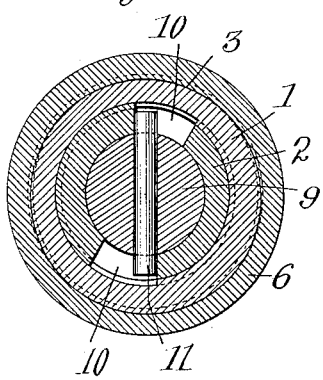
Figure 4:
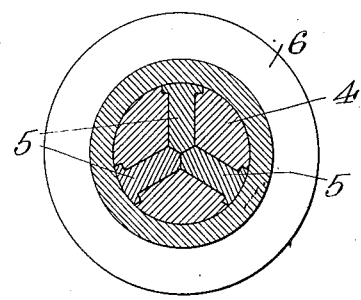

Figs. 3 and 4 are transverse sections taken on the lines 3—3 and 4—4 of Fig. 1, respectively;

Fig. 5 is a longitudinal sectional view, slightly enlarged, showing the jaws released;

Fig. 6 is a cross section taken on the line 6—6 of Fig. 5;

Fig. 7, also slightly enlarged, is a view similar to Fig. 4 but showing the jaws retracted.

While the detailed construction of the chuck may be varied, the drawings illustrate the present invention applied to a chuck comprising a tubular body or case 1 and an open-ended head or shell 2 within the case and having a threaded connection therewith as shown at 3. The case has a frusto-conical or tapered end 4 which is slotted longitudinally to receive the jaws 5, said jaws being confined in the slots by a cap 6 and provided at their inner ends with hooks 7 engaging an annular flange 8 on the front end of the spindle 9 which extends axially through the head and into the case.

In carrying out my present invention I provide in the front end of the head or shell 2 notches or recesses 10, positioned diametrically opposite each other. Inserted through the spindle with its ends projecting into said notches is the pin 11. Upon the circumference of the spindle I form a helical cam or coarse thread 12 disposed at a greater angle to the axis of the spindle than the angle of the threads connecting the head and the case and engaging a similarly arranged groove or cam 13 in the bore of the head. The difference in pitch referred to, however, is probably not essential to the operation of the chuck.

In the operation of such a chuck the rotation of the case will cause the jaws to rotate about the spindle and the threaded connection of the case with the head will impart a relative axial movement between the spindle and the case. As the jaws cannot move axially relative to the spindle they will be caused to ride up or down the inclined plane presented by the tapered end of the case, consequently traveling radially toward or from the axis of the spindle to grip or release the shank of the drill or other tool according to the direction of rotation of the case.

Assuming the jaws to be tightly closed, it being desired to release them, the case is rotated in the proper direction, the spindle being held against rotation. The binding contact or frictional resistance of the threads between the case and head being greater than that of the threads between the head and spindle, the head will move with the case so that these two elements will rotate together about the spindle, their simultaneous movement being first governed by the engagement of the rib 12 and the groove 13, the extent of their simultaneous rotation being limited by the impact of the end walls of the notches 10 against the pin 11. The helical disposition of the rib 12 and groove 13 will impart an axial movement to the head and case, which, as has been explained, will effect a radial movement of the jaws. It will thus be seen that the helical rib constitutes a cam to impart a slight initial axial movement to the case and head whereby the jaws will be caused to relax their grip upon the tool. The recess and pin constitute a stop device to limit this initial movement. When the pin engages the end of the recess, the head will be locked to the spindle and further relative movement between the spindle and the head will be arrested. Upon continued rotation the case will turn relatively to the head, continuing, but at a slower rate the retracting motion of the jaws fully to open the same, the entire operation being effected by one continuous, uninterrupted motion of the case.

It will be understood that if the case be rotated in the opposite direction the operation will be reversed and the jaws will be made to close and grip the tool.

My invention comprising these inter-operating elements one or more of which can be made to act with the exertion of less force than the rest, is an efficient improvement in chucks whereby an initial easy release of the jaws is effected through a convenient and uninterrupted manipulation.

No broad claim is made herein to the generic basic invention disclosed as such claims are made in my U. S. Patent No. 1,150,142. Many minor changes in the details of the species herein shown may be made, however, without involving a departure from the spirit of the present invention as the same is defined in the appended claims.

I claim:—

1. In a chuck, the combination of a spindle, a threaded head journaled thereon and having a slight axial movement relatively thereto, radially movable jaws engaging the spindle, and a threaded case screwed upon the head and operatively connected to the jaws to move the latter radially as the case is rotated on the head, and means including a cam on the head for deflecting relative axial movement between the head and the spindle and jaws as the case is rotated, said cam having threads inclined in the same direction as the threads of the case and head, the threads of the cam having a steeper pitch than those of the case and head.

2. In a chuck, the combination of a spindle, a threaded head journaled thereon, radially movable jaws engaging the spindle, a threaded case screwed upon the head and operatively connected to the jaws to move the latter radially as the case is rotated on the head, and a cam and stop device connecting the head and the spindle to effect a limited relative axial movement of the same and initially relax the jaws as the case is rotated the cam portion of said cam and stop device having threads inclined in the same direction as the threads of the case and head, but having a more rapid incline than those of the case and head.

3. In a chuck, the combination of a spindle, a head mounted on the spindle and having a transverse recess, a projection on the spindle engaging said recess, a cam between the head and the spindle, radially movable jaws engaging the spindle, and a case having threads inclined in the same direction as and at a less rapid angle than the inclination on the cam, said case being rotatably and axially movable upon the head and operatively connected with the jaws to move the same radially.

4. In a chuck, the combination of a spindle, a head mounted theron and having a recess in its end and a cam groove in its bore, projections on the spindle engaging said recess and groove respectively, radially movable jaws engaging the spindle, and a case axially and rotatably movable on the head and operatively connected with the jaws to move the same radially as the case is rotated, said case and head having threads inclined in the same direction as that of said cam groove, but at a less rapid inclination than that of said cam groove.

5. In a chuck, the combination of a spindle, a head mounted thereon and having a recess in its end and a cam groove in its bore, a radial projection on the spindle engaging said recess and a rib on the spindle engaging said groove, radially movable jaws engaging the spindle, and a case threaded upon the head and operatively connected with the jaws, the thread of said case and head being inclined in the same direction as said cam groove and rib, but at a less steep incline than that of said cam groove.

6. In a chuck, the combination of a spindle, a threaded head journaled thereon and having a slight axial movement relatively thereto, radially movable jaws engaging the spindle, a threaded case screwed upon the head and operatively connected to the jaws to move the latter radially as the case is rotated on the head, and means including a cam on the head for effecting relative axial movement between the head and the spindle and jaws as the case is rotated, said cam having threads inclined in the same direction as the threads of the case and head.

7. In a chuck, a spindle, a head mounted thereon, radially movable jaws engaging the spindle, a threaded case screwed upon the head and operatively connected to the jaws to move the latter radially as the case is rotated, and a cam and stop device between the head and spindle to effect a limited relative axial movement of the same, and initially relax the jaws as the case is rotated, the cam portion of said cam and stop device having threads inclined in the same direction as the threads of the head and case.

8. In a chuck, a spindle, a recessed head mounted thereon, a projection on the spindle engaging said recess so as to limit the movement of the head relatively to the spindle, cam means between the head and spindle, jaws interconnected with the spindle, and a case rotatably movable upon the head and operatively connected with the jaws to move the same radially.

9. In a chuck, a spindle, a head movably mounted thereon, means for limiting the relative movement between the head and the spindle, jaws interconnected with the spindle, a case movably mounted upon the head and operatively interconnected with the jaws to effect the opening and closing thereof, and means whereby the jaws may be operated by relative movement between the spindle and head or by relative movement between the head and case.

10. In a chuck, a spindle, a head mounted thereon and having a recess so as to limit the movement of the head relatively to the spindle, a projection on the spindle engaging said recess, a cam between the head and the spindle, radially movable jaws engaging the spindle, and a case having threads inclined in the same direction as the cam rotatably and axially movable upon the head and operatively connected with the jaws to move the same radially.

11. In a chuck, an exteriorly threaded spindle 9, an externally and internally threaded shell 2 mounted thereon, the pin 11 mounted on said spindle and so engaging the shell 2 as to limit the movement thereof, a case 1, and jaws 5 interconnected with said case and spindle, as and for the purposes set forth.

In testimony whereof I affix my signature, in presence of two witnesses.

ALEXANDER P. MORROW.

Witnesses:
H. W. PATON,
FLORENCE G. FOSTER.